UNITED STATES PATENT OFFICE.

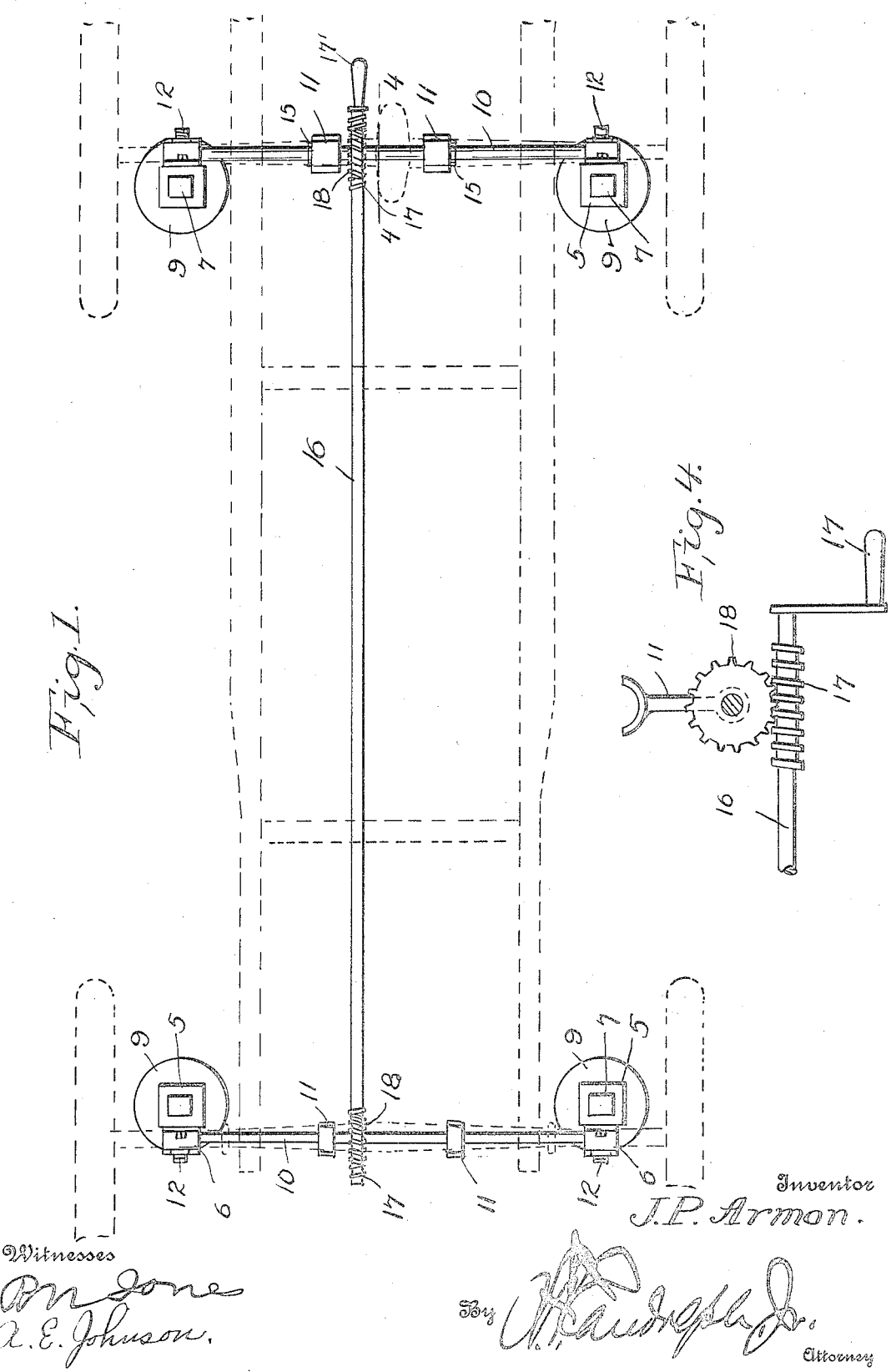

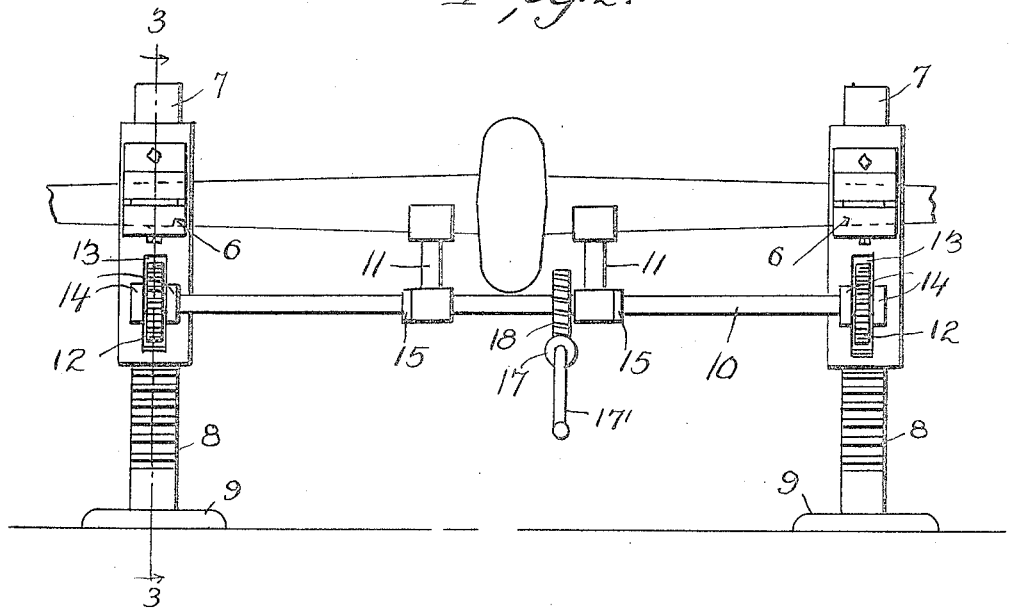
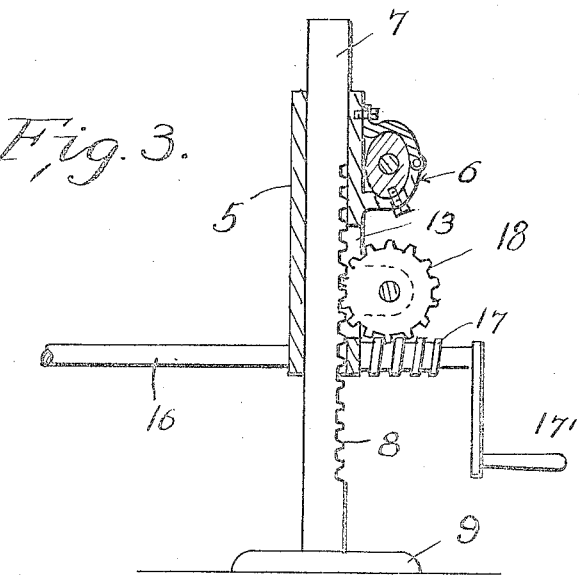

JOSEPH P. ARMON, OF CHICAGO, ILLINOIS.

VEHICLE-JACK.

1,092,001.　　　　　Specification of Letters Patent.　　Patented Mar. 31, 1914.

Application filed August 14, 1913. Serial No. 784,816.

*To all whom it may concern:*

Be it known that I, JOSEPH P. ARMON, a citizen of the United States, residing at Chicago, in the county of Cook and State of Illinois, have invented certain new and useful Improvements in Vehicle-Jacks; and I do hereby declare the following to be a full, clear, and exact description of the invention, such as will enable others skilled in the art to which it appertains to make and use the same.

This invention comprehends improvements in vehicle jacks and relates more particularly to those of the type which are adapted to be permanently attached to a vehicle, so that the same may be quickly raised above a supporting surface.

It is a well known fact that when pneumatic tired vehicles, such as automobiles, are left standing for any great length of time, the strain upon the tires is very great, owing to the weight of the vehicle, and my invention aims to provide a simple and convenient jack, which is always at hand, so that when the machine is placed in the garage or left standing in any place whatsoever, it may be hoisted so as to raise the wheels from contact with a supporting surface.

Another and more specific object of the invention is to provide a vehicle hoisting device, including a pair of casings secured to each axle of a vehicle, a rack standard movable through each of said casings, and means for simultaneously actuating said rack standards so as to lower them in contact with a supporting surface and raise the wheels of the vehicle from contact therewith.

With these and other objects in view, as will become more apparent as the description proceeds, the invention consists in certain novel features of construction, combination and arrangement of parts, as will be hereinafter fully described and claimed.

For a complete understanding of my invention, reference is to be had to the following description and accompanying drawings, in which—

Figure 1 is a top plan view of my vehicle jack, the frame, wheels, and axles of an automobile being shown in dotted lines, Fig. 2 is a rear elevation of my improved jack, showing the same attached to the frame of a vehicle, Fig. 3 is a section taken on the plane of line 3—3 of Fig. 2, and Fig. 4 is a section taken on the plane of line 4—4 of Fig. 1.

In the preferred embodiment of my invention I secure to each of the vehicle axles a pair of hollow guides, or casings 5. These casings are rectangular in cross section, as clearly shown in Fig. 1, and are secured to the axles by means of suitable straps 6. These straps are preferably formed in sections, one of which is integral with casing and the other of which is hinged to said integral section, as shown in Fig. 3. A rack standard 7 having teeth 8 formed upon one side thereof, and an enlarged base 9 extends through each of the guides, or casings 5. A transverse shaft 10 is suspended from each of the axles by means of the hangers 11, and carries adjacent its ends spur gears 12 which are adapted to mesh with the teeth 8 of the rack standards. The casings are longitudinally slotted, as indicated by the numeral 13, to permit the spur gears engaging the teeth 8. To assist the hangers 11 in supporting the rotatable shafts 10, I form a pair of apertured ears 14 upon each of the casings 5 on opposite sides of the slot 13 formed therein and extend the shafts 10 through these ears. Set collars 15 may be provided for holding the transverse shaft against longitudinal movement.

To provide a means for simultaneously rotating the transverse shafts 10, I provide a longitudinal shaft 16, which may be supported in any suitable manner and which is provided with worms 17, which are adapted to mesh with worm wheels 18 rigidly secured to the transverse shafts 10.

In operation, when it is desired to lift the wheels of a vehicle for engagement with the ground, or other supporting surface, the shaft 16 is rotated by means of a crank handle 17' secured to one end thereof, and because of the worm 17 and worm wheels 18, causes the transverse shafts to be rotated. This rotation of the transverse shafts will move the standards downwardly until the bases 9 come in contact with the supporting surface, after which a further rotation of the transverse shafts will cause the vehicle to be lifted. When the jack is not in use, the rack standards are lifted so as to bring the bases 9 into engagement with the lower ends of the casings 5.

From the foregoing description taken in connection with the accompanying drawings, it will be apparent that I have provided an extremely simple, practical and efficient vehicle raiser, or jack, which may be permanently attached to a vehicle and which will operate to easily raise the wheels of a vehicle from contact with a supporting surface.

While I have shown and described the preferred embodiment of my invention, it will be understood that minor changes, such as different arrangements of gearing and different structures of various parts may be made without departing from the scope and spirit of the invention as claimed.

Having thus described my invention, I claim:—

1. The combination with a vehicle, of a pair of hollow guides rigidly secured to each of the axles thereof, a standard slidable through each of said guides, a pair of transverse shafts, bearings depending from the axles for supporting said shafts, means operable by a rotation of the shafts for moving the standard simultaneously in the same direction, a main shaft extending longitudinally of the vehicle, a crank handle secured to one end of the main shaft, a worm wheel rigidly secured to each of the transverse shafts, and a pair of worms formed on the main shaft for engagement with the worm wheels, whereby, when the main shaft is rotated, the transverse shafts will be operated.

2. The combination with a vehicle, of a pair of hollow guides rigidly secured to each of the axles thereof, a rack standard slidable through each of said guides and formed with an enlarged base, a transverse shaft journaled under each of the axles, a pair of spur gears rigidly secured to each of the transverse shafts and meshing with the rack standards, the guides being slotted to permit of the spur gears engaging said standards, a longitudinal shaft, a pair of worms formed upon said shaft, a worm wheel rigidly secured to each of the transverse shafts and meshing with one of said worms, and means for rotating the longitudinal shaft, whereby the rack standard may be simultaneously raised or lowered.

In testimony whereof I affix my signature in presence of two witnesses.

JOSEPH P. ARMON.

Witnesses:
PAUL OSTERTAG,
LILLIAN STICHA.